(12) United States Patent
Ganzenmuller

(10) Patent No.: US 6,490,751 B2
(45) Date of Patent: Dec. 10, 2002

(54) VEHICLE VACUUM SYSTEM

(76) Inventor: William Ganzenmuller, 3408 Seneca Ave., Chesapeake, VA (US) 23325

( * ) Notice: Subject to any disclaimer, the term of this patent is extended or adjusted under 35 U.S.C. 154(b) by 0 days.

(21) Appl. No.: 09/955,590

(22) Filed: Sep. 17, 2001

(65) Prior Publication Data

US 2002/0032946 A1 Mar. 21, 2002

Related U.S. Application Data

(60) Provisional application No. 60/233,100, filed on Sep. 15, 2000.

(51) Int. Cl.[7] .................................................. A47L 5/38
(52) U.S. Cl. .............................. 15/313; 15/339; 15/405
(58) Field of Search ......................... 15/313, 339, 405, 15/330

(56) References Cited

U.S. PATENT DOCUMENTS 3,431,581 A * 3/1969 Booth .......................... 15/313
3,449,787 A * 6/1969 Rothstein et al. .............. 15/313
5,189,753 A    3/1993 Sousa
5,829,091 A    11/1998 Ingram
6,128,804 A * 10/2000 Lee et al. ...................... 15/313
6,148,472 A * 11/2000 Arena ........................... 15/313

* cited by examiner

Primary Examiner—Chris K. Moore
(74) Attorney, Agent, or Firm—Neil F. Markva

(57) ABSTRACT

The present invention relates to a vacuum cleaning system and more particularly pertains to a direct port vacuum cleaning system for use in a motor vehicle anytime or anywhere. The system comprises a vacuum generating unit and a vacuum cleaner hose. The vacuum generating unit comprises an electric motor, an impeller and a removable debris canister. The removable debris canister contains a vacuum cleaner hose attachment end and is directly connected to the vacuum cleaner hose. The vacuum generating unit also contains a vacuum exhaust port, located at the opposite end of the vacuum generating unit from the vacuum cleaner hose attachment end. The vacuum generating unit is powered by the vehicle's battery. The battery's power is converted from DC to AC by power inversion means.

7 Claims, 4 Drawing Sheets

VEHICLE VACUUM SYSTEM

Claim OF BENEFIT OF PROVISIONAL APPLICATION

Pursuant to 35 U.S.C. section 119, the benefit of priority from provisional application 60/233,100, with a filing date of Sep. 15, 2000, is claimed for this non-provisional application.

BACKGROUND OF THE INVENTION

1. Field of the Invention

The present invention relates to a vacuum cleaning system and more particularly pertains to a direct port vacuum cleaning system for use in a motor vehicle anytime or anywhere.

2. Description of the Prior Art

The use of vacuum cleaning systems is known in the prior art. Various vacuum cleaning systems are described in U.S. Pat. No. 5,829,091; U.S. Pat. No. 5,189,753, U.S. Pat. No. 4,829,626; U.S. Pat. No. 5,274,878; U.S. Pat. No. 5,239,727; and U.S. Pat. No. 4,991,253.

While these devices fulfill their respective, particular objectives and requirements, the aforementioned patents do not disclose an in-vehicle, direct port vacuum cleaning system. Particularly, U.S. Pat. No. 5,829,091 describes a central vacuum cleaning system. It requires a vacuum port including a vacuum line located within the panels of the automobile. The vacuum line is difficult to assemble and replace. It is also decreases the suction power of the vacuum.

The present device comprises a direct port vacuum. It does not require piping throughout the vehicle, therefore, it is easily installed and readily removed. In these respects, the in-vehicle, direct port, vacuum system according to the present invention substantially departs from the conventional concepts and designs of the existing art, and in so doing provides an apparatus primarily developed for the purpose of providing the opportunity to vacuum an automobile anytime or anywhere.

SUMMARY OF THE INVENTION

In view of the foregoing disadvantages inherent in the known types of vacuum cleaning systems now present, the instant invention provides an in-vehicle, direct port, vacuum cleaning system which is operated from a vehicle battery and can be used while the vehicle is in use.

The general purpose of the present invention is to provide an in-vehicle, direct port, vacuum cleaning apparatus and method which has many of the advantages of the vacuum cleaning systems mentioned heretofore and many novel features that result in a system which is not anticipated, rendered obvious, suggested, or even implied by any other vacuum cleaning systems, either alone or in any combination thereof.

To attain this, the present invention generally comprises a vacuum generating unit and a direct port vacuum cleaner hose. The vacuum generating unit is powered by the vehicle's battery via power inversion means and runs on 110 volts of power.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide an in-vehicle, direct port, vacuum cleaning system which has many of the advantages of the vacuum cleaning systems mentioned heretofore and many novel features that result in a system which is not anticipated, rendered obvious, suggested, or even implied by any of the prior art vacuum cleaning systems, either alone or in any combination thereof.

It is another object of the present invention to provide an in-vehicle, direct port, vacuum cleaning system which may be easily and efficiently installed and removed.

Still another object of the present invention is to provide an in-vehicle, direct port, vacuum cleaning system for providing the opportunity to vacuum a vehicle anytime or anywhere. Still another object of the present invention is to provide an in-vehicle, direct port, vacuum cleaning system that does not require a vacuum line throughout the vehicle.

Yet another object of the present invention is to provide an in-vehicle, direct port, vacuum cleaning system that can be used to blow dry hair, blow up flat tires, blow off debris from the driveway and the like.

Yet another object of the present invention is to provide an in-vehicle, direct port, vacuum cleaning system that is powered by the vehicle's battery via power inversion means.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
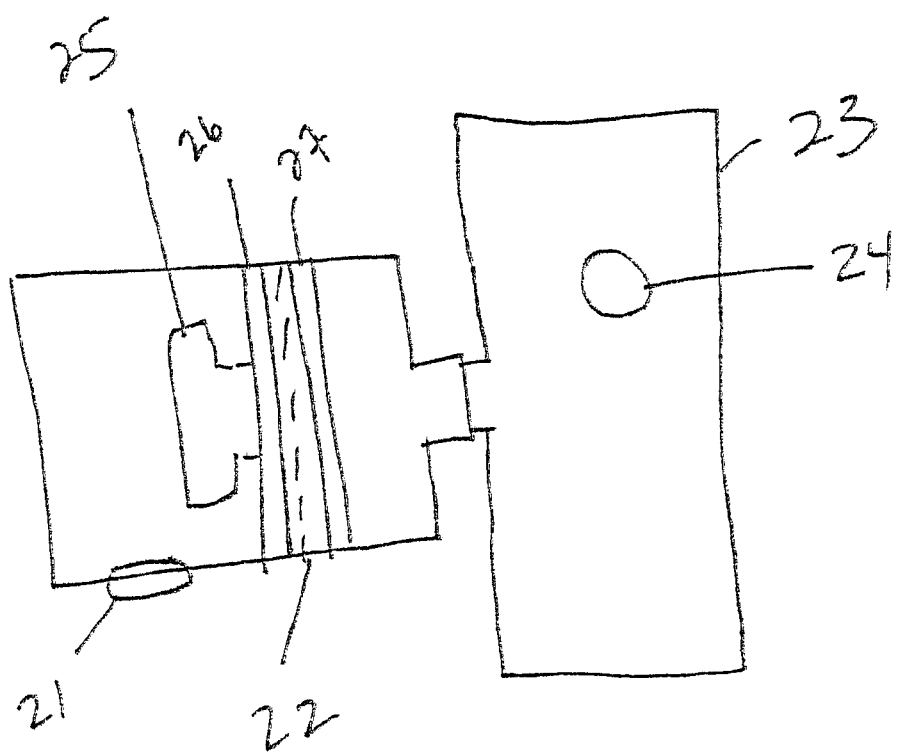
FIG. 2 is an enlarged detail of the vacuum generating unit, front side.

The. present invention comprises a vacuum generating unit 12 and a vacuum cleaner hose. As shown in FIG. 2, the vacuum generating unit 12 comprises an electric motor 25, an impeller 22 and a removable debris canister 23. The removable debris canister 23 contains a vacuum cleaner hose attachment end 24 and is directly connected to the vacuum cleaner hose via its vacuum cleaner hose attachment end 24. The vacuum generating unit 12 also contains an vacuum exhaust port 21, located at the opposite end of the vacuum generating unit from the vacuum cleaner hose attachment end 24, as shown in FIG. 2.

Figure 1:
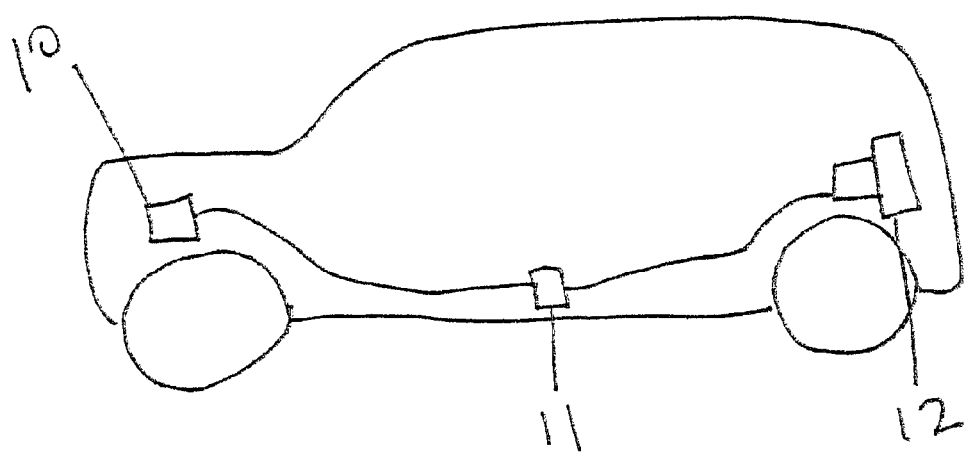
FIG. 1 is a side view of the in-vehicle, direct port vacuum cleaning system installed in a vehicle according to the present invention.

Referring now to FIG. 1, the vacuum generating unit 12 is powered by the vehicle's battery 10. The battery's power is converted from DC to AC by power inversion means 11. Power inversion means 11 include, but are not limited to, a power inverter, a computer chip, fuse or fuseable link. In a preferred embodiment, the vacuum generating unit's electric motor 25 is run on 110 volt power. Power is controlled by a remote power switch located conveniently within the vehicle. Wiring connects the power inversion means to the vacuum generating unit 12, providing zero to approximately 1,000 watts of power to the system. In addition to the system operating while the engine is on, it can also run for some time after the engine has been turned off. In a preferred embodiment, an indicator light notifies the user that it is time to start the vehicle. Also, if the power source is draining too much power, the system automatically shuts down to let the user know to start the engine.

Figure 4:
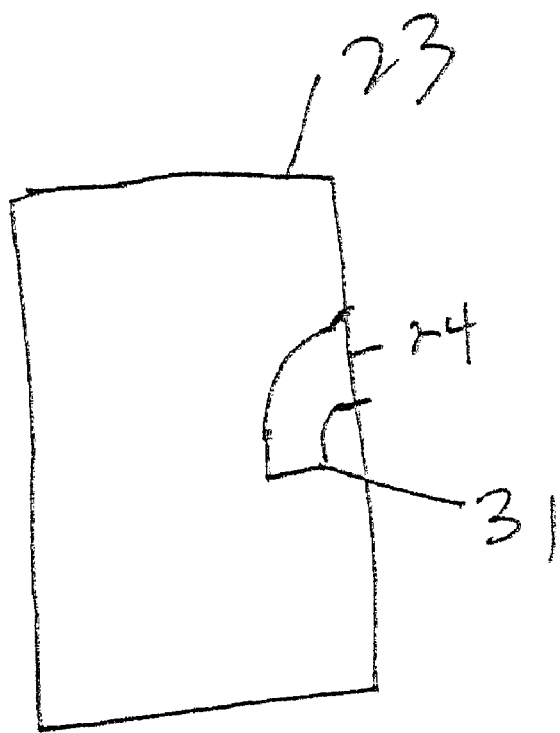
FIG. 4 is a cross section of the debris canister.

The vacuum hose is directly and detachably connected to the debris canister 23. There is direct port intake of debris into the debris canister 23. As shown in FIG. 4, baffle means 31 provides for the debris to be diverted to the bottom of the debris canister 23. Debris may include both solid and liquid waste. In a preferred embodiment, baffle means 31 is a downward, interior, curved extension of the vacuum cleaner hose attachment end 24. The debris canister is easily detached and emptied. It is connected to the rest of the vacuum generating unit by conventional means.

Figure 3:
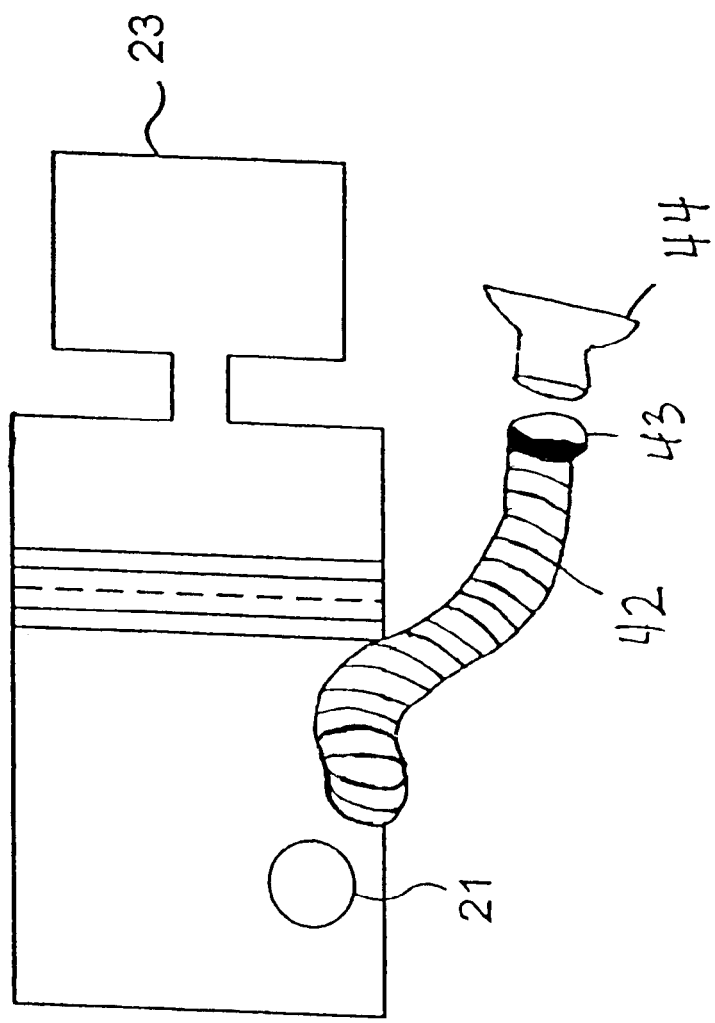
FIG. 3 is an enlarged detail of the vacuum generating unit, bottom side.

In a preferred embodiment, a hose 42 is connected to the vacuum exhaust port 21, to permit the vacuum cleaning system to function as a blower. In a preferred embodiment, as shown in FIG. 3, the vacuum exhaust port 21 is located on the bottom of the vacuum generating unit 12. Attachments 44 are connected to the hose 42, thus permitting blow drying hair 44, blowing sand off kids or dogs, blowing dirt and dust off tools, blowing up inner-tubes, rafts, rubber boats, blowing up flat tires and the like. Any old and well know attachment tools of those commonly used with blowers may be used with the present invention.

The vacuum generating unit is located within the vehicle. In a preferred embodiment, as shown in FIG. 1, the vacuum generating unit 12 and hose are located in the back side panel of the an automobile or the back cab of a sport utility vehicle. Dimensions of the vacuum generating unit 12 may vary, depending on the space available and according to the needs of the user. In a preferred embodiment, the vacuum generating unit 12 has a vertical measurement of approximately twelve to fourteen inches and a horizontal measurement of approximately eight to twelve inches. The general appearance of the system is in the shape of perpendicular rectangles. The debris canister 23 is a horizontal rectangle, whereas, the rest of the unit is vertical. As shown in FIG. 2, the impeller is encased by a front 27 and back mounting 26. The mounting and positioning of the impeller 22 and motor 25 prevent contact with debris.

The vacuum cleaner hose comprises a flexible vacuum hose 42 with a vacuum port attachment end and an attachment tool end. The flexible vacuum hose may be of the expandable and retractable type and may be stored in the vehicle. A vacuum cleaner hose attachment tool 44 may be attached to the attachment tool end 43 of the vacuum cleaner hose. Any old and well known attachment tools of those commonly used with vacuum cleaners may be used with the present invention As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A direct port vacuum cleaning system located within a vehicle, for use within the vehicle, comprising:
    a vacuum generating unit including a vacuum hose attachment end; and
    a vacuum cleaner hose directly and removably attached to the vacuum hose attachment end of the vacuum generating unit;
    wherein said vacuum generating unit includes an exhaust port connected to an exhaust port hose having an exhaust port hose end and an attachment tool end.

2. A direct port vacuum cleaning system located within a vehicle, for use within the vehicle, comprising:
    a vehicle battery;
    power inversion means connected to said battery;
    a vacuum generating unit connected to said power inversion means, further comprising:
        an electric motor;
        an impeller;
        a debris canister including a vacuum hose attachment end; and
        an exhaust port; and
    a vacuum cleaner hose directly and removably attached to the vacuum hose attachment end of the debris canister;
    wherein said exhaust port is connected to an exhaust hose containing an exhaust port hose end and an attachment tool end.

3. The direct port vacuum cleaning system as in claim 2, wherein said exhaust hose includes an attachment tool connected to the attachment tool end of the exhaust hose.

4. The direct port vacuum cleaning system as in claim 3, wherein said attachment tool is a hair dryer.

5. The direct port vacuum cleaning system as in claim 4, wherein said attachment tool is a tire inflater.

6. The direct port vacuum cleaning system as in claim 2, wherein said debris canister is capable of containing liquid and solid debris.

7. The direct port vacuum cleaning system as in claim 2, wherein said power inversion means is a power inverter.

* * * * *